Figure 1:
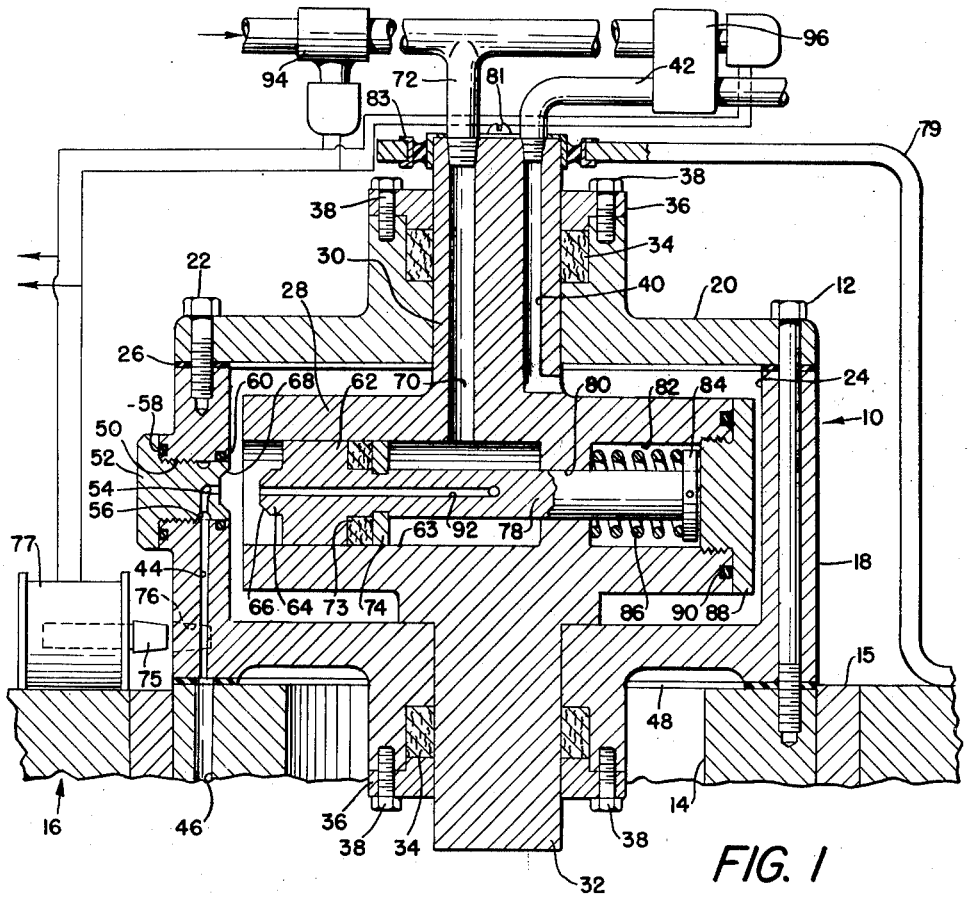

Oct. 27, 1953  D. F. COLLINS  2,656,847
ROTARY COUPLING AND VALVE
Filed May 29, 1951

INVENTOR
DON F. COLLINS

BY
Oldham & Oldham
ATTORNEYS

Patented Oct. 27, 1953

2,656,847

UNITED STATES PATENT OFFICE 2,656,847

ROTARY COUPLING AND VALVE

Don F. Collins, Akron, Ohio, assignor to Adamson United Company, Akron, Ohio, a corporation of Ohio Application May 29, 1951, Serial No. 228,911

13 Claims. (Cl. 137—112)

This invention relates to a combined rotary coupling and pressure-actuated valve for a hydraulic system, and more particularly, is concerned with a fluid coupling for continuously connecting a plurality of fluid lines to a source of hydraulic fluid under pressure, the coupling being adapted to successively connect each of the fluid lines to a second source of hydraulic fluid at higher pressure.

While rotary couplings have been advanced in the prior art for providing a pressure-fluid connection between a stationary and rotating member, known couplings have not been readily adaptable for use where fluid at two different pressures, one continuously and one intermittently, are to be coupled. Such is the requirement of the fluid coupling in a rotary press of the type described in the co-pending application Serial No. 228,912, filed May 29, 1951, in which a plurality of hydraulic presses are supported in a rotating frame. A constant hydraulic pressure is applied to the presses at all times. In addition, a greatly increased fluid pressure is applied successively to each of the presses as they are indexed around with the rotary frame.

It is the object of this invention to provide a hydraulic coupling for such an application which is comparatively simple in its design, foolproof in operation, rugged, fluid-tight, compact, and easily assembled and installed.

Another object of this invention is the provision of a fluid coupling which continuously connects a plurality of fluid lines on a rotating member to a stationary source of hydraulic fluid under pressure.

Another object of this invention is to provide a rotary valve which successively disconnects each of the fluid lines on the rotary member from the hydraulic fluid source and at the same time connects the lines to a second hydraulic fluid source at greatly increased pressure.

Another object of this invention is to provide a rotary valve which is actuated by the increased pressure of the second hydraulic fluid source to momentarily cut off the low pressure supply and connect the line to the high-pressure fluid supply.

These and other objects of the invention which will become apparent as the description proceeds are achieved by providing in combination a fluid-tight housing carried by the rotating member having a substantially cylindrical chamber therein, the principal axis of which coincides with the axis of the rotating member. A stationary valve block is journaled for relative rotatable movement within the housing chamber and has connected thereto through a sealed joint in the housing a low-pressure and high-pressure fluid line. The block has a fluid passage communicating with the low-pressure line and opening into the chamber of the housing. A plurality of fluid-discharge lines carried by the rotating member open into the fluid chamber within the housing through valve seats circumferentially spaced around the cylindrical wall of the chamber. The valve block has a cylindrical bore therein in which is slidably carried a piston having a projecting valve portion on one face thereof adapted to engage each of the valve seats in fluid-tight engagement by outward movement of the piston in the bore. The block has a fluid passage communicating with the high-pressure fluid line and opening into the bore back of the piston whereby introduction of the high-pressure fluid actuates the piston to move the valve into sealed engagement with the valve seat. A small bore fluid passage through the valve and piston permits the passage of high-pressure fluid into the discharge fluid line associated with the valve seat engaged with the valve. Spring means disengages the valve from the seat when the high pressure fluid is cut off.

Figure 2:
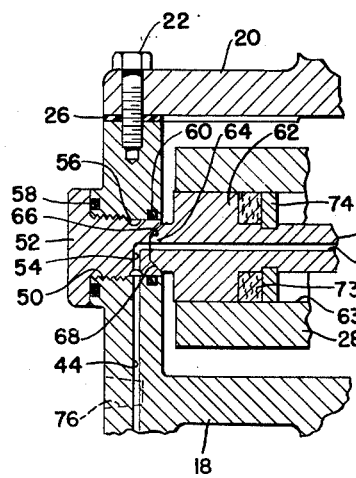

For a better understanding of the invention, reference should be had to the accompanying drawings, wherein:

Fig. 1 is a cross-sectional view of the rotary coupling and showing details of the valve structure; and Fig. 2 is a fragmentary cross-sectional view showing the valve in "closed" position for introducing high-pressure fluid into the discharge fluid line.

With specific reference to the form of the invention illustrated in the drawings, the numeral 10 indicates generally the rotary coupling, which is mounted by means of bolts 12 to the end of a hollow shaft 14. The hollow shaft 14 is journaled by means of sleeve bearings 15 in a frame member indicated generally at 16. For the sake of clarity and description, the rotary coupling 10 is illustrated as it is installed in the rotary press for which it was designed, which includes the hollow shaft 14 and the frame member 16, only fragments of which are illustrated. It is to be particularly understood that the invention is not limited to the mounting illustrated but can be readily adapted to any installation in which its function is desired without departing from the spirit and scope of the invention.

The coupling 10 has a rotary housing which includes a substantially bell-shaped housing member 18. A cover 20 bolted to the housing member 18 by means of bolts 22 completes the housing assembly and provides a substantially cylindrical chamber 24 therein. A gasket 26 insures a pressure-sealed joint between the cover 20 and the housing member 18. Located within the chamber 24 is the stationary valve block 28 having a pair of integrally formed trunnions 30 and 32 journaled in the cover 20 and housing member 18 respectively. Rotary seals between the trunnions and the housing are effected by annular packing units 34 which are held in position by means of sealing caps 36, bolted to the housing by means of bolts 38.

Fluid under pressure is admitted to the chamber 24 by means of a fluid passage 40 through the trunnion 30, the passage communicating with an hydraulic line 42 from a source of hydraulic fluid under pressure of preferably 2,000 lbs. per square inch. Any suitable coupling such as a pipe thread connection can be used to connect the line 42 to the passage 40.

Discharge of the hydraulic fluid under pressure to the rotary assembly of the associated press is effected preferably by means of a plurality of passages 44 which are in axial alignment with similar passages 46 in the hollow shaft 14. A gasket 48 between the housing of the rotary coupling and the end of the shaft 14 insures a sealed joint between the two members. The passages 44 communicate with a plurality of circumferentially spaced openings, indicated at 50, which are radially directed through the wall of the housing member 18 into the chamber 24. Each of the openings 50 has threadably secured therein a hardened steel plug 52. A passage 54 in each of the plugs connects the chamber 24 with an annular groove 56 around the plug opposite the opening of the passage 44 whereby fluid under pressure in the chamber 24 is discharged to each of the passages 46 in the hollow shaft 14. O-ring seals 58 and 60 seal the plugs to the housing on either side of the annular grooves 56 to prevent leakage.

In order to introduce hydraulic fluid at greatly increased pressure successively to each of the passages 46, a special valve arrangement is provided and includes a piston 62 slidably supported within a bore 63 formed in the block 28. The bore 63 is radially directed and so positioned that it passes through axial alignment with the holes 50 as the housing is rotated relative to the block. The outer face of the piston 62 has a valve body 64 projecting therefrom, the valve body 64 having a beveled edge 66 adapted to engage the mating valve seats 68 in each of the plugs 52. Thus, it will be appreciated that, when the bore 63 is in axial alignment with one of the holes 50, outward movement of the piston 62 will cause the valve body 64 to engage the valve seat 68 to cut off the flow of fluid from the chamber 24 into the passage 54.

To effect movement of the piston 62 against the pressure of the fluid within the chamber 24, fluid under a high pressure of approximately 6,000 lbs. per square inch is introduced into the bore 63 adjacent the back side of the piston 62 by the provision of a fluid passage 70 which communicates with the high-pressure hydraulic line 72. Thus, when fluid under high pressure is introduced through the passage 70, the piston 62 is forced outwardly so as to bring the valve body 64 into engagement with the particular valve seat in alignment therewith. An annular seal 73 and retainer 74 provide a pressure seal between the piston and wall of the bore.

To lock the housing in position as each successive plug 52 and associated valve seat 68 is indexed around by any suitable means (not shown) into axial alignment with the piston and valve body assembly, a spring-actuated lock pin 75 is provided which engages a notch 76 in the housing member 18. A solenoid 77, mounted on the frame 16, slidably supports the lock pin and serves to disengage the pin when energized.

To secure the valve body 28 against rotation and to insure proper alignment of the valve 64 with the valve seats 68, a special bracket 79 is provided which is secured at one end to the frame 16 and at the other supports a collar 83, preferably of a rubber torsion type which is in turn secured by means of screws 81 to the end of the trunnion 30. The rubber torsion type collar 83 permits slight rotation of the valve body so that any slight misalignment with the valve seats can be adjusted for by the wedging action of the beveled surfaces 66.

Integrally formed on the back side of the piston 62 is a stem 78 extending through a hole 80 in the bottom of the bore 63 into a cylindrical space 82 in the block 28. A collar 84 is pinned or otherwise secured to the end of the stem 78 and engages a compression spring 86 concentrically located with respect to the stem 78. Spring 86 reacts against the action of the fluid pressure on the piston 62 and serves to withdraw the valve body from the valve seat when the fluid pressure on the piston 62 is released. Plug 88 is threadably engaged in the end of the block 28 to close off the space 82. In addition, an O-ring seal 90 is provided to prevent any possible leakage of the high-pressure hydraulic fluid into the chamber 24.

A small bore fluid passage 92 extends through the valve body 64, piston 62, and up into the stem 78 and opens into the fluid space within the bore 63. The passage 92 is in axial alignment with the opening of the passages 54, so that when the valve body is seated, the high-pressure fluid from the line 72 enters the associated discharge fluid passage 46.

A solenoid-operated valve, indicated generally at 94, controls the flow of hydraulic fluid in the high-pressure line 72. The valve 94 is so arranged that it is closed when the solenoid of the valve is energized. Thus, in operation, the solenoid 77 and the solenoid valve 94 are simultaneously energized during the time the rotary assembly is indexed to the next position. The current to the two solenoids is then cut off, the locking pin 75 engages with the housing to lock it in position, and simultaneously high-pressure fluid from the line 72 enters through passage 70 and forces the valve body 64 into engagement with the valve seat 68.

In addition, a second solenoid valve 96 connects the high pressure line 72 to the low pressure line 42. The solenoid valve 96 functions to relieve the high pressure in back of the piston 62 when the solenoid valve 94 is shut off, thereby permitting the valve 64 to disengage with the valve seat 68 under the action of spring 86.

From the above description, it will be appreciated that the objects of the invention have been achieved by the provision of a rotary coupling which connects a plurality of hydraulic lines carried by a rotary member to a fixed source of hydraulic fluid under pressure. By a special valve arrangement, each of the discharge fluid lines are successively connected to a separate source of high-pressure hydraulic fluid. The combination rotary coupling and valve is a compact, self-contained unit. Structurally it is uncomplicated, easy to manufacture, yet rugged, fluid-tight, and has a minimum of wearing parts and surfaces.

While, in accordance with the patent statutes, one best known embodiment of the invention has been illustrated and described, it is to be particularly understood that the invention is not to be limited thereto or thereby, but that its scope is defined in the appended claims.

What is claimed is:

1. A combined rotary coupling for continuously connecting a plurality of fluid lines carried by rotatable means to a source of fluid under pressure, the coupling being adapted to successively connect each of the fluid lines to a second source of fluid at higher pressure, the combination including a fluid-tight housing carried by said rotatable means, a stationary block journaled for relative rotatable movement within the housing, a low-pressure and high-pressure fluid line connected to the block, said block having a fluid passage communicating with the low-pressure fluid line and opening into the space enclosed by the housing, a plurality of valve seats circumferentially spaced in the housing around the axis of rotation of the housing relative to the block, one of said plurality of fluid lines connecting to each of the valve seats, a piston, the valve block having a bore therein slidably carrying the piston, a valve body carried by the piston and adapted to seat in each of the valve seats as they move into position, said block having a fluid passage communicating with the high-pressure fluid line and opening into the bore in back of the piston whereby the high-pressure fluid actuates the piston to move the valve into seating engagement with the valve seats, said piston and valve body having a fluid passage extending therethrough communicating with the high-pressure fluid space in back of the piston and connecting through the valve seats with the fluid lines leading from the valve seats, indexing means for rotatably positioning the housing and said rotatable means to successively align each of the valve seats with the high-pressure valve body, and valve means associated with the high-pressure fluid line for interrupting the flow of high-pressure fluid, said valve means being actuated to cut off the flow to the block during the time the housing is indexing from one position to the next.

2. A combined rotary coupling for continuously connecting a plurality of fluid lines carried by rotatable means to a source of fluid under pressure, the coupling being adapted to successively connect each of the fluid lines to a second source of fluid at higher pressure, the combination including a fluid-tight housing carried by said rotatable means, a stationary block journaled for relative rotatable movement within the housing, a low-pressure and high-pressure fluid line connected to the block, said block having a fluid passage communicating with the low-pressure fluid line and opening into the space enclosed by the housing, a plurality of valve seats circumferentially spaced in the housing around the axis of rotation of the housing relative to the block, one of said plurality of fluid lines connecting to each of the valve seats, a piston, the valve block having a bore therein slidably carrying the piston, a valve body carried by the piston and adapted to seat in each of the valve seats as they move into position, said block having a fluid passage communicating with the high-pressure fluid line and opening into the bore in back of the piston whereby the high-pressure fluid actuates the piston to move the valve into seating engagement with the valve seats, said piston and valve body having a fluid passage extending therethrough communicating with the high-pressure fluid space in back of the piston and connecting through the valve seats with the fluid lines leading from the valve seats, and indexing means for rotatably positioning the housing and said rotatable means to successively align each of the valve seats with the high-pressure valve body.

3. A combined rotary coupling for continuously connecting a plurality of fluid lines carried by rotatable means to a source of fluid under pressure, the coupling being adapted to successively connect each of the fluid lines to a second source of fluid at higher pressure, the combination including a fluid-tight housing carried by said rotatable means, a stationary block journaled for relative rotatable movement within the housing, a low-pressure and high-pressure fluid line connected to the block, said block having a fluid passage communicating with the low-pressure fluid line and opening into the space enclosed by the housing, a plurality of valve seats circumferentially spaced in the housing around the axis of rotation of the housing relative to the block, one of said plurality of fluid lines connecting to each of the valve seats, a piston, the valve block having a bore therein slidably carrying the piston, and a valve body carried by the piston and adapted to seat in each of the valve seats as they move into position, said block having a fluid passage communicating with the high-pressure fluid line and opening into the bore in back of the piston whereby the high-pressure fluid actuates the piston to move the valve into seating engagement with the valve seats, said piston and valve body having a fluid passage extending therethrough communicating with the high-pressure fluid space in back of the piston and connecting through the valve seats with the fluid lines leading from the valve seats.

4. A rotary coupling and valve combination of the type described including a rotary housing having a fluid-tight substantially cylindrical chamber therein, a stationary block, trunnions secured to the block and journaled in the housing, said trunnions extending through the walls of the housing and supporting the block within the chamber for relative rotational movement between the block and housing, the block having a radially extending bore, a piston slidably carried within the bore, a valve body projecting outwardly from the face of the piston, a plurality of valve seats spaced circumferentially around the chamber at equal intervals and secured to the housing and positioned to receive the valve body as the housing is rotated to bring the valve seats successively in alignment with the valve body, each of the valve seats having a fluid discharge passage opening into the chamber through the center of the valve seat, one of the trunnions having a low-pressure fluid intake passage therethrough opening into the chamber, one of the trunnions having a high-pressure fluid intake passage therethrough opening into the bore behind the piston, said fluid passages connecting to external sources of low and high pressure fluid respectively, the piston and valve body having a fluid passage extending therethrough, said passage being adapted to connect with the discharge passage opening in the valve seats, and means for cutting off the high-pressure fluid from the bore during the interval the housing indexes from one valve seat position to the next.

5. A rotary coupling and valve combination of the type described including a rotary housing having a fluid-tight substantially cylindrical chamber therein, a stationary block, trunnions secured to the block and journaled in the housing, said trunnions extending through the walls of the housing and supporting the block within the chamber for relative rotational movement between the block and housing, the block having a radially extending bore, a piston slidably carried within the bore, a valve body projecting outwardly from the face of the piston, and a plurality of valve seats spaced circumferentially around the chamber at equal intervals and secured to the housing and positioned to receive the valve body as the housing is rotated to bring the valve seats successively in alignment with the valve body, each of the valve seats having a fluid discharge passage opening into the chamber through the center of the valve seat, one of the trunnions having a low-pressure fluid intake passage therethrough opening into the chamber, one of the trunnions having a high-pressure fluid intake passage therethrough opening into the bore behind the piston, said fluid passages connecting to external sources of low and high pressure fluid respectively, the piston and valve body having a fluid passage extending therethrough, said passage being adapted to connect with the discharge passage opening in the valve seats.

6. A rotary coupling and valve combination of the type described including a housing having a fluid-tight chamber therein, a block, trunnions secured to the block and journaled in the housing, said trunnions extending through the walls of the housing and supporting the block within the chamber for relative rotational movement between the block and housing, the block having a radially extending bore, a piston slidably carried within the bore, a valve body projecting outwardly from the face of the piston, and a plurality of valve seats spaced circumferentially around the chamber at equal intervals and secured to the housing and positioned to receive the valve body as the housing is rotated to bring the valve seats successively in alignment with the valve body, each of the valve seats having a fluid discharge passage opening into the chamber through the center of the valve seat, one of the trunnions having a low-pressure fluid intake passage therethrough opening into the chamber, one of the trunnions having a high-pressure fluid intake passage therethrough opening into the bore behind the piston, said fluid passages connecting to external sources of low and high pressure fluid respectively, the piston and valve body having a fluid passage extending therethrough, said passage being adapted to connect with the discharge passage opening in the valve seats.

7. A rotary coupling and valve combination of the type described including a housing having a fluid-tight chamber therein, a block, pivotal support means secured to the block and journaled in the housing, said means extending through the walls of the housing and supporting the block within the chamber for relative rotational movement between the block and housing, the block having a bore, a piston slidably carried within the bore, a valve body projecting outwardly from the face of the piston, and a plurality of valve seats spaced circumferentially around the chamber and secured to the housing and positioned to receive the valve body as the housing is rotated to bring the valve seats successively in alignment with the valve body, each of the valve seats having a fluid discharge passage opening into the chamber through the center of the valve seat, said pivotal support means having a low-pressure fluid intake passage therethrough opening into the chamber and having a high-pressure fluid intake passage therethrough opening into the bore behind the piston, said fluid passages connecting to external sources of low and high pressure fluid respectively, the piston and valve body having a fluid passage extending therethrough, said passage being adapted to connect with the discharge passage opening in the valve seats.

8. A rotary coupling and valve combination including a stationary means, a rotary housing journaling said means, the housing having a fluid-tight substantially cylindrical chamber, the housing having a plurality of discharge fluid passages therein opening into said chamber at circumferentially spaced points, said stationary means having a fluid intake passage therein opening to said chamber whereby fluid under pressure enters the chamber and is discharged through said discharge passages, a valve seat associated with each of the discharge fluid openings, fluid-actuated valve means associated with said stationary means within the chamber and adapted to successively seat in said valve seats when actuated to cut off the flow of fluid from the chamber into the particular discharge fluid passage, said valve means having a high-pressure fluid passage therein positioned to communicate with the discharge fluid passage when the valve means is engaged with a particular valve seat, indexing means associated with the housing for successively positioning the valve means opposite each valve seat, and means for delivering high-pressure fluid into said high pressure fluid passage for actuating said valve means as the housing is indexed to successively bring each valve seat into position for engagement with the valve means, said high-pressure fluid passing through said fluid passage into the associated discharge fluid passage.

9. A rotary coupling and valve combination including a stationary means, a rotary housing journaling said means, the housing having a fluid-tight substantially cylindrical chamber, the housing having a plurality of discharge fluid passages therein opening into said chamber at circumferentially spaced points, said stationary means having a fluid intake passage therein opening to said chamber whereby fluid under pressure enters the chamber and is discharged through said discharge passages, a valve seat associated with each of the discharge fluid openings, fluid-actuated valve means associated with said stationary means within the chamber and adapted to successively seat in said valve seats when actuated to cut off the flow of fluid from the chamber into the particular discharge fluid passage, said valve means having a high-pressure fluid passage therein positioned to communicate with the discharge fluid passage when the valve means is engaged with a particular valve seat, and means for delivering high-pressure fluid into said high pressure fluid passage for actuating said valve means at the housing is indexed to successively bring each valve seat into position for engagement with the valve means, said high-pressure fluid passing through said fluid passage into the associated discharge fluid passage.

10. A rotary coupling and valve combination including a stationary means, a rotary housing journaling said means, the housing having a fluid-tight substantially cylindrical chamber, the housing having a plurality of discharge fluid passages therein opening into said chamber at circumferentially spaced points, said stationary means having a fluid intake passage therein opening to said chamber whereby fluid under pressure enters the chamber and is discharged through said discharge passages, a valve seat associated with each of the discharge fluid openings, and fluid-actuated valve means associated with said stationary means within the chamber and adapted to successively seat in said valve seats when actuated to cut off the flow of fluid from the chamber into the particular discharge fluid passage, said valve means having a high-pressure fluid passage therein positioned to communicate with the discharge fluid passage when the valve means is engaged with a particular valve seat.

11. A rotary fluid coupling and valve comprising a valve block, a rotary housing encompassing said valve block and forming an annular chamber therearound, said housing having a plurality of discharge passages connecting to said chamber, bore means in said valve block connecting to said chamber to transmit fluid under pressure thereto, a valve piston slidably carried by said valve block, and supply means for transmitting fluid under pressure to said piston to urge it towards said housing, said piston having a bore therein for connecting a selected one of said discharge passages to the fluid pressure applied to said piston when the fluid pressure supply means are actuated.

12. A rotary fluid coupling and valve comprising a valve block, a rotary housing encompassing said valve block and forming a chamber around at least a portion of said valve block, said housing having a plurality of spaced discharge passages connecting to said chamber, bore means connecting to said chamber to transmit fluid under pressure thereto for flow to said discharge passages, a valve piston slidably carried by said valve block, and supply means for transmitting fluid under pressure to said piston to urge it towards said housing, said piston having a bore therein for connecting one of said discharge passages to said fluid pressure supply means and sealing it from said chamber.

13. A rotary fluid coupling and valve comprising a valve block, a rotary housing encompassing said valve block and forming a chamber therearound, said housing having a plurality of discharge passages connecting to said chamber, bore means connecting to said chamber to transmit fluid under pressure thereto, a valve piston slidably carried by said valve block, supply means for transmitting fluid under pressure to said piston to urge it towards said housing, said piston having a bore therein for connecting one of said discharge passages to said fluid pressure supply means, and means for actuating said fluid pressure supply means when said rotary housing is in a predetermined position with relation to said piston to connect said fluid pressure supply means to one of said discharge passages whereby a different pressure can be set up therein from the pressure in the remaining of said discharge passages.

DON F. COLLINS.

References Cited in the file of this patent

UNITED STATES PATENTS

| Number | Name | Date |
|---|---|---|
| 1,562,573 | Matter | Nov. 24, 1925 |